(12) United States Patent
Bleibler

(10) Patent No.: US 7,045,210 B2
(45) Date of Patent: May 16, 2006

(54) REINFORCING BAR AND METHOD FOR THE PRODUCTION THEREOF

(75) Inventor: Alexander Bleibler, Winterthur (CH)

(73) Assignee: Sika Schweiz AG, Zurich (CH)

( * ) Notice: Subject to any disclaimer, the term of this patent is extended or adjusted under 35 U.S.C. 154(b) by 118 days.

(21) Appl. No.: 10/468,677

(22) PCT Filed: Jan. 9, 2002

(86) PCT No.: PCT/EP02/00119

§ 371 (c)(1),
(2), (4) Date: Aug. 21, 2003

(87) PCT Pub. No.: WO02/066762

PCT Pub. Date: Aug. 29, 2002

(65) Prior Publication Data

US 2004/0065044 A1     Apr. 8, 2004

(30) Foreign Application Priority Data

Feb. 21, 2001   (DE)  ............................... 101 08 357

(51) Int. Cl.
  *B32B 5/02*     (2006.01)
(52) U.S. Cl. ...................... 428/367; 428/374; 428/392; 428/395; 428/397; 428/399; 52/740.5

(58) Field of Classification Search ................ 428/397, 428/374, 399, 367, 392, 395; 52/740.5
See application file for complete search history.

(56) References Cited

U.S. PATENT DOCUMENTS

| | | | |
|---|---|---|---|
| 4,194,873 A | 3/1980 | Killmeyer | |
| 6,060,163 A | 5/2000 | Naaman | |
| 2001/0023568 A1 * | 9/2001 | Edwards et al. | ........... 52/649.1 |

FOREIGN PATENT DOCUMENTS

| | | |
|---|---|---|
| GB | 2 190 931 A | 12/1987 |
| JP | A 11-320696 | 11/1999 |
| WO | WO 96/16792 | 6/1996 |
| WO | WO 98/31891 | 7/1998 |
| WO | WO 01/51730 A1 | 7/2001 |

* cited by examiner

*Primary Examiner*—Alexander S. Thomas
(74) *Attorney, Agent, or Firm*—Oliff & Berridge, PLC

(57) ABSTRACT

The invention relates to a reinforcing bar for mineral building materials, particularly for cement. The inventive reinforcing bar (10) is made of a bar of plastic material reinforced by fiber, which has a central, elongate core (12) and several ribs (14) which extend along the length of the core, which are disposed at an angular distance from each other, which form a cross or a star in the cross section thereof and which are twisted around the core axis (16) in a helical manner.

16 Claims, 2 Drawing Sheets

REINFORCING BAR AND METHOD FOR THE PRODUCTION THEREOF

Figure 1A:
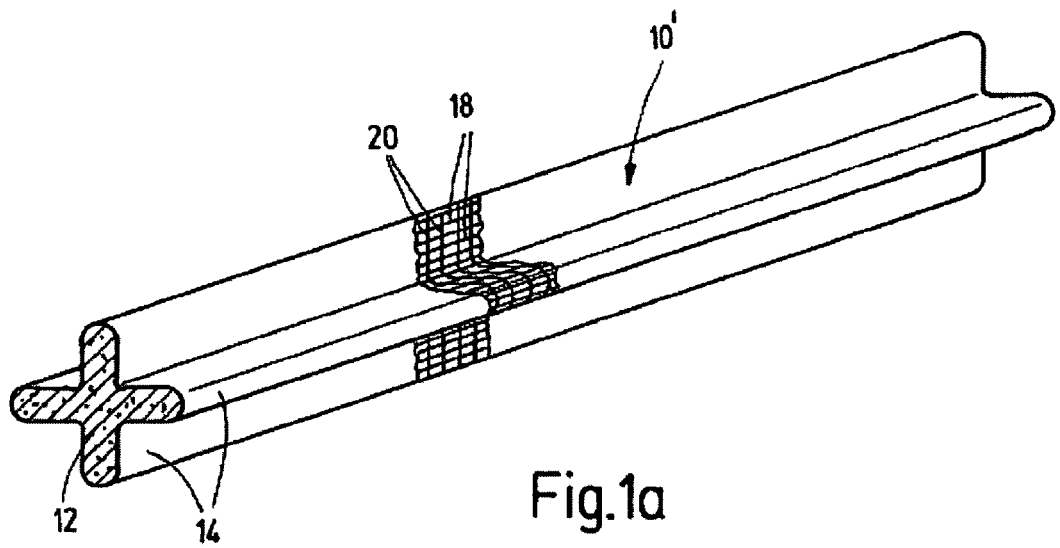

The invention relates to a reinforcing bar for mineral-based building materials, especially concrete, and a method for manufacture thereof.

Building components such as, for example, ceilings or supports, must carry compressive, tensile, and shearing forces. So such building components generally are manufactured from steel-reinforced concrete or prestressed concrete. Concrete is subject to compressive loading and steel is subject to tensile loading. Up to now, the bars or wires required for reinforcement of concrete have been mainly manufactured from steel. For this purpose, steel has the advantage that it is chemically compatible with concrete. A disadvantage, however, is the susceptibility to corrosion by rusting. When rust appears, the concrete separates from the reinforcing bar, so damage and deterioration can occur. This means that steel-reinforced concrete constructions must be regularly inspected and repaired.

In order to avoid this, it has already been suggested to coat the steel with synthetic resin, for example with epoxy resin. However, it has been shown that when the synthetic resin coating is damaged, pitting occurs at rust spots and progresses rapidly. Another disadvantage of coated steel reinforcement is the poor adhesion between the concrete and the reinforcement. The form-locking fit to the surface ribs of the reinforcing bars is not sufficient because of the faulty adhesive fit.

Therefore the aim of the invention is to develop a reinforcing bar for mineral-based building materials, especially for concrete, that is simple to manufacture and that can be securely anchored in the building material, and that can be transported and installed without risk of damage.

The combinations of features recited in the independent claims are proposed to achieve this aim. Advantageous embodiments and further developments of the invention are recited in dependent claims.

A concept essential to the invention is that the reinforcing bar is formed by means of a fiber-reinforced plastic strand which has a long central core and several spaced-apart ribs oriented at an angle to one another along the entire length of the core and having star-shaped or cross-shaped cross section, that are each helically twisted all around the core axis. The ribs of the strand at the same time conveniently project beyond the surface of the core by at least one rib width equal to the core diameter. A form-fitted anchoring of the reinforcing bar in the concrete results from the helical winding of the ribs. In order to be able to carry the desired tensile forces, at least some of the reinforcement fibers are formed as longitudinal fibers that run continuously along the strand and are aligned parallel to the axis in the core region and in the direction of the pitch of the ribs in the rib region. The individual reinforcement fibers formed as longitudinal fibers in the rib region in this case conveniently run at a constant distance from the core axis.

In order to enable reliable handling of the reinforcing bars at the construction site, the strand is additionally reinforced, at least in the region of the ribs, with transverse or circumferential fibers. The transverse fibers prevent buckling or sagging of the grooves between the ribs when the reinforcing bars are piled on top of one another during transport and during use. When the bars are piled on top of one another, contact points are formed at sufficiently short intervals by means of the helically twisted ribs to make sure that no deformation occurs under load. The latter is also important in the assembled state, if the reinforcing bars are laid in a criss-cross pattern. While the longitudinal fibers in the reinforcing bars have the function of tension reinforcement, the transverse fibers have the function of buckling reinforcement. In a preferred embodiment of the invention, the ribs of the strand are oriented at identical angles to one another and the ribs are twisted with a constant pitch. However, in principle it is also possible for the ribs to be twisted along the strand with variable pitch. The pitch angle of the ribs relative to the core axis can be adjusted over relatively broad limits and can be optimized. It is conveniently between 15° and 75°, preferably 30° to 50°.

The longitudinal and transverse fibers conveniently form a fiber fabric or crossply. The reinforcement fibers are advantageously selected from the group of carbon fibers, glass fibers, aramid fibers, high-strength polyethylene fibers, basalt fibers, natural fibers, or from a mixture of those fibers. The reinforcement fibers in the near-surface region of the strand are conveniently selected as carbon fibers because of chemical compatibility with concrete, while less expensive glass fibers and the like can also be used in deeper layers of the strand interior.

The plastic matrix of the strand may be made of a thermosetting plastic polymer material, preferably from the group of epoxy resin, polyester resin, vinyl resin. In order to enable easier deformation of the strand during the manufacturing process, it may be advantageous for the plastic matrix to consist of a thermoplastic, preferably from the group of polyamide (PA), polymethylmethacrylate (PMMA), polyphenylene sulfide (PPS), polypropylene (PP), polyethylene terephthalate (PET), polybutylene terephthalate (PBT), polyetherimide (PEI), styrene polymer (ABS), polyetheretherketone (PEEK).

The method for manufacture of the reinforcing bars according to the invention essentially involves helically twisting and cutting into lengths a fiber-reinforced plastic strand with star-shaped or cross-shaped cross section.

In principle, in this case it is possible to embed a fiber or fabric core into the plastic strand during its manufacture by a pultrusion process (strand drawing).

For manufacture of the plastic strand according to the invention, it is preferred for a prefabricated sheet, ribbon, or tubular starting material made from fiber-reinforced plastic to be reshaped, preferably folded, to form a strand with cross-shaped or star-shaped cross section, and to then be helically twisted and cured. In this case it is especially advantageous if sheet, ribbon, or tubular material, containing a thermoplastic as a binder matrix, is reshaped into the fiber-reinforced plastic strand using pressure and heat. In manufacture of the fiber reinforcement, at least two layers made from different fiber materials can be used in the sheet, ribbon, or tubular starting material, where an outer layer conveniently consists of carbon fibers.

Figure 1B:
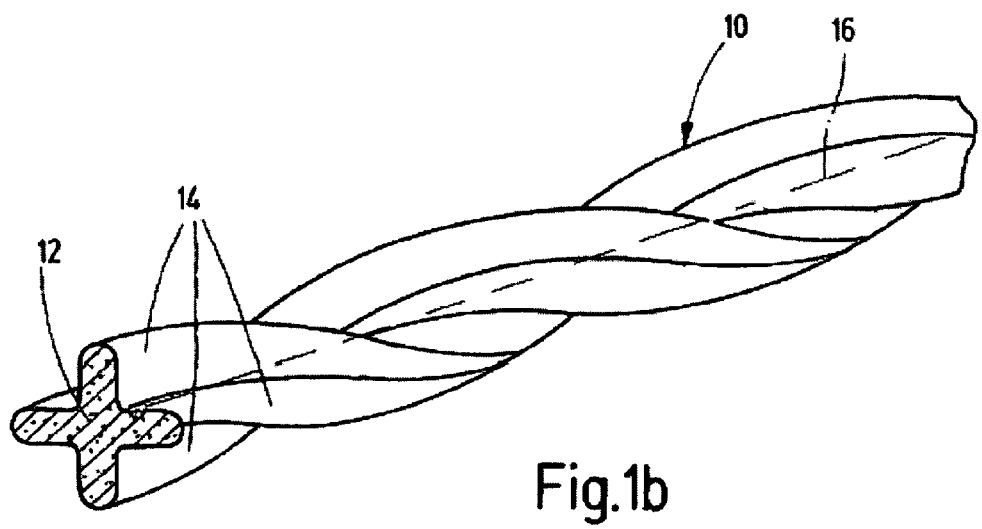
Figure 2A:
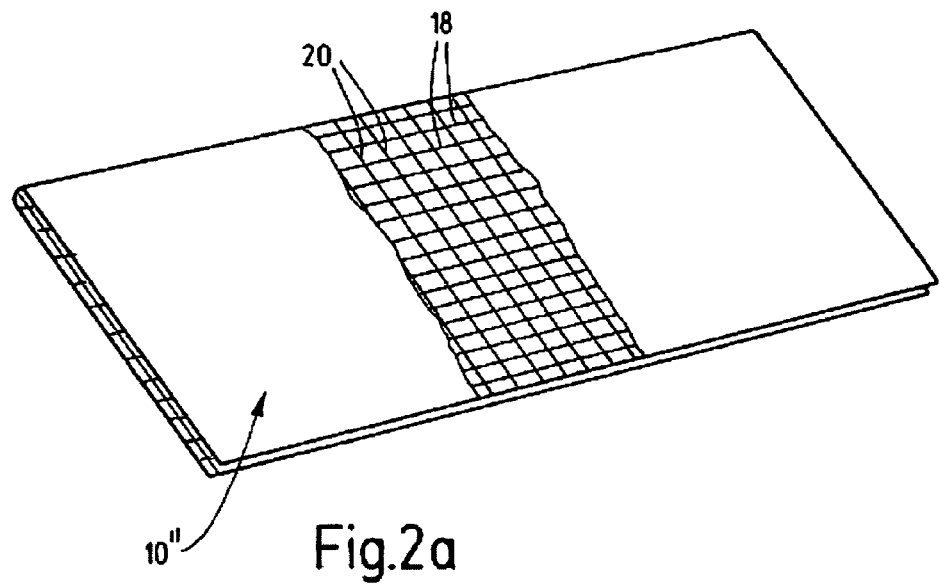
Figure 2B:
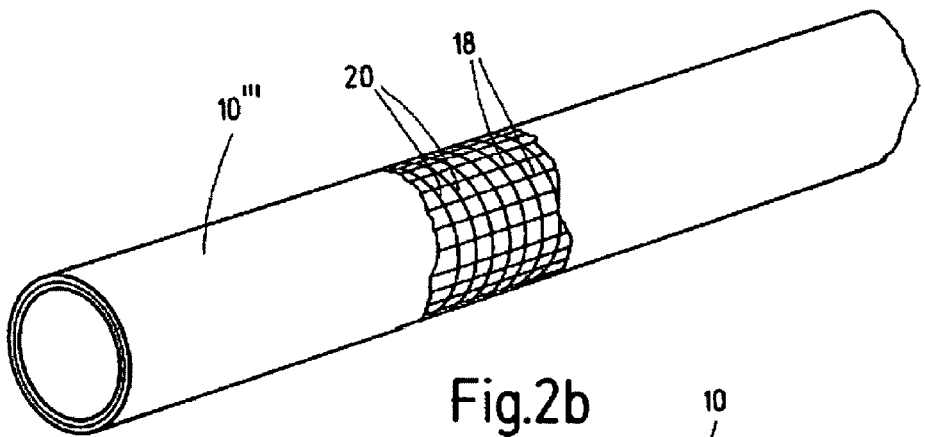
Figure 2C:
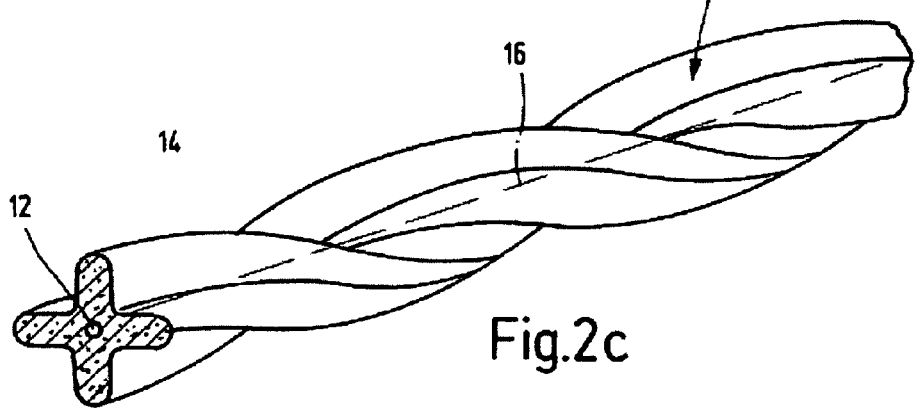

The invention is explained in more detail in the following with the help of schematically represented exemplary embodiments in the drawing. The drawing shows FIGS. 1a and 1b a schematic representation of a reinforcing bar with cross-shaped cross section, before and after helical twisting;

FIGS. 2a through 2c sheet or ribbon shaped starting material (FIG. 2a) and tubular starting material (FIG. 2b) for manufacture of a twisted reinforcing bar with cross-shaped cross section (FIG. 2c), in a schematic partial cutaway view.

The reinforcing bars represented in the drawing are intended for reinforcement of concrete building components.

Reinforcing bar 10 is made up of a fiber-reinforced plastic strand which has a long central core 12 and several spaced-apart ribs 14 oriented at an angle to one another along the entire length of the core and having star-shaped or cross-shaped cross section. The starting material is, for example, the strand shape 10', the ribs 14 thereof are helically twisted around core axis 16 in the same direction and with the same pitch in order to form the reinforcing bar shown in FIG. 1b. Some of the reinforcement fibers are formed as longitudinal fibers 18. In the final product as in FIG. 1b, longitudinal fibers 18 run parallel to the core axis 16 in the core region, while in the region of the ribs 14 they run parallel to the ribs and so are aligned in the direction of the pitch of ribs 14. The individual longitudinal fibers 18 in the rib region are a constant distance from core axis 16 over their entire length. The purpose of longitudinal fibers 18 inside reinforcing bar 10 is especially to carry tensile forces. Twisting ribs 14 of the strand results in a stable form-locking fit inside the concrete which, in spite of the otherwise smooth surface of the reinforcing bar, prevents reinforcing bar 10 from loosening its bond with the surrounding concrete.

Other reinforcement fibers 20 run inside the strand shape, essentially transverse to longitudinal fibers 18. This is also the case in the region of ribs 14. Transverse fibers 20 provide buckling reinforcement that can carry shearing forces acting on reinforcing bar 10, in order to reduce the risk of buckling. In the exemplary embodiment shown in FIG. 1b, the pitch angle of ribs 14 relative to core axis 16 is about 30° to 40°. Since there are a total of four ribs here, when the reinforcing bars are stacked on top of one another there are sufficiently short support lengths between two bearing points, which oppose sagging under load or during use.

FIGS. 2a to 2c schematically indicate that sheet or ribbon shaped starting material 10" (FIG. 2a) or tubular starting material 10''' (FIG. 2b) can also be used to manufacture reinforcing bars with a cross-shaped cross section.

There are various options for manufacture of sheet or ribbon shaped starting material 10". In the "rolltrusion" process, individual filaments, fabric, or crossply are pre-impregnated and passed through a roller press. As a result, a thin ribbon is produced that is just too thin for the purposes relevant here. So several ribbons must be laid on top of one another and bonded together by heating and melting. As a result, ribbons with different reinforcing cores, such as carbon fiber or glass, can also be used. Ribbons prefabricated in this way are then heated, folded into a cross, and helically twisted. A disadvantage of this process is the relatively slow production rate. Also only high-quality thermoplastics such as polyamides can be used for the binder matrix.

Another option for manufacture of sheet material is for prefabricated fabric and crossply to be impregnated with a binder and fed to a double band press. The fabric or crossply can be a combination of different fibers and can be made relatively thick.

As a result, a continuous sheet material 10" is obtained that at elevated temperature can be, for example, deformed into the desired cross shape and twisted. The difference from the rolltrusion process is the fact that we begin with a finished fabric and crossply with sufficient wall thickness, so that several sheets do not have to be assembled together to make a multilayer system. In this case, thermoplastics can be used as binders from the group of polyamide (PA), polymethylmethacrylate (PMMA), polyphenylene sulfide (PPS), polypropylene (PP), polyethylene terephthalate (PET), polybutylene terephthalate (PBT), polyetherimide (PEI), styrene polymer (ABS), polyetheretherketone (PEEK). In the double band press, the material is first heated up and then cooled down gradually over the length of the press, so that an already cured material comes out at the end. An essential advantage of the method is the high production rate. The variety of fibers and binder materials that can be used also permits cost optimization.

There are likewise various options for manufacture of tubular starting materials as in FIG. 2b:

In the pultrusion process (strand drawing), impregnated continuous fibers are pultruded over a mandrel. This can be done in several steps, where crosswinding can also be carried out following each process step. In this case, a tube 10''' with longitudinal and transverse fibers is obtained, where the fibers also can be made from different materials such as, for example, carbon fibers outside and glass inside. The tube is then subsequently heated, pressed into a cross, and twisted.

Impregnated braided tubing made from the desired fiber material can also be used for manufacture of tubes 10''' as in FIG. 2b. Braided tubes are first manufactured in braiding machines in the form of a fiber tube and then impregnated with binder.

The impregnated tube is then again pressed into a cross shape and twisted. In principle, it is also possible to first deform the braided tubing into a cross shape and to only then impregnate it.

In summary, we can say the following: The invention relates to a reinforcing bar for mineral-based building materials, especially concrete. Reinforcing bar 10 according to the invention is made up of a fiber-reinforced plastic strand which has a long central core 12 and several spaced-apart ribs 14 oriented at an angle to one another along the entire length of the core and having star-shaped or cross-shaped cross section, that are helically twisted around core axis 16.

The invention claimed is:

1. Reinforcing bar for mineral-based construction materials, especially concrete, comprising a fiber-reinforced plastic matrix strand including a long central core and several spaced-apart ribs oriented at an angle to one another along an entire length of the core and having a star-shaped cross section or a cross-shaped cross section, the ribs being helically twisted around an axis of the core, the strand being reinforced by (1) individual longitudinal fibers at least in a rib region that run at a constant distance from the axis of the core and (2) transverse fibers at least in the rib region.

2. Reinforcing bar as in claim 1, wherein at least some of the individual longitudinal fibers run continuously along the strand and are aligned parallel to the axis in a core region and in the direction of the twist of the ribs in the rib region.

3. Reinforcing bar as in claim 1, wherein the ribs of the strand are oriented at identical angles to one another.

4. Reinforcing bar as in claim 1, wherein the ribs of the strand are twisted along the strand with a constant pitch.

5. Reinforcing bar as in claim 1, wherein the ribs of the strand are twisted along the strand with variable pitch.

6. Reinforcing bar as in claim 1, wherein a pitch angle of the twist of the ribs of the strand relative to the core axis is 15° to 75°.

7. Reinforcing bar as in claim 1, wherein the ribs of the strand project beyond the surface of the core by at least one rib width equal to the core diameter.

8. Reinforcing bar as in claim 1, wherein reinforcement fibers comprise at least one of carbon fibers, glass fibers, aramid fibers, high-strength polyethylene fibers, basalt fibers, or natural fibers.

9. Reinforcing bar as in claim 8, wherein the reinforcement fibers, at least in a near-surface region of the strand, are carbon fibers.

10. Reinforcing bar as in claim 1, wherein the longitudinal fibers and the transverse fibers form a fiber fabric or cross-ply.

11. Reinforcing bar as in claim 1, wherein the plastic matrix of the strand is made from thermosetting plastic polymer material.

12. Reinforcing bar as in claim 11, wherein the thermosetting plastic polymer material comprises at least one of an epoxy resin, a polyester resin or a vinyl resin.

13. Reinforcing bar as in claim 1, wherein the plastic matrix of the strand is made of a thermoplastic.

14. Reinforcing bar as in claim 13, wherein the thermoplastic comprises at least one of polyamide, polymethylmethacrylate, polyphenylene sulfide, polypropylene, polyethylene terephthalate, polybutylene terephthalate, polyetherimide, styrene polymer, or polyetheretherketone.

15. Reinforcing bar as in claim 1, wherein a pitch angle of the twist of the ribs of the strand relative to the core axis is 30° to 50°.

16. Reinforcing bar as in claim 1, wherein the ribs of the strand project beyond the surface of the core by at least one rib width equal to twice the core diameter.

* * * * *